US011680846B1

(12) United States Patent
Worley, III

(10) Patent No.: US 11,680,846 B1
(45) Date of Patent: *Jun. 20, 2023

(54) SYSTEM FOR DETECTING NOISE IN WEIGHT DATA

(71) Applicant: AMAZON TECHNOLOGIES, INC., Seattle, WA (US)

(72) Inventor: William Spencer Worley, III, Camano Island, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 65 days.

This patent is subject to a terminal disclaimer.

(21) Appl. No.: 17/186,967

(22) Filed: Feb. 26, 2021

Related U.S. Application Data

(63) Continuation of application No. 15/091,048, filed on Apr. 5, 2016, now Pat. No. 10,935,416, which is a continuation of application No. 14/133,447, filed on Dec. 18, 2013, now abandoned.

(51) Int. Cl.
G01G 3/147 (2006.01)
G01G 19/414 (2006.01)
G01G 23/01 (2006.01)
G01G 23/06 (2006.01)
G06Q 10/08 (2023.01)
G01G 3/14 (2006.01)
G06Q 10/087 (2023.01)
G01G 19/12 (2006.01)

(52) U.S. Cl.
CPC ............. *G01G 23/01* (2013.01); *G01G 3/147* (2013.01); *G01G 3/1414* (2013.01); *G01G 23/06* (2013.01); *G06Q 10/087* (2013.01); *G01G 19/12* (2013.01); *G01G 19/4144* (2013.01)

(58) Field of Classification Search
CPC ...... G01G 3/1414; G01G 3/147; G01G 19/12; G01G 19/4144; G01G 23/01; G01G 23/06; G06Q 10/087
See application file for complete search history.

(56) References Cited

U.S. PATENT DOCUMENTS

| | | | | |
|---|---|---|---|---|
| 3,826,319 A | * | 7/1974 | Loshbough | G01G 23/46 177/25.15 |
| 4,593,778 A | * | 6/1986 | Konishi | G01G 23/06 177/229 |
| 4,926,359 A | * | 5/1990 | Konishi | G01G 23/10 702/194 |
| 5,117,929 A | * | 6/1992 | Nakamura | G01G 23/10 177/185 |

(Continued)

Primary Examiner — Randy W Gibson
(74) Attorney, Agent, or Firm — Lindauer Law, PLLC

(57) ABSTRACT

Noise that is present in the output of a weight sensor can lead to erroneous weight data. A moveable device, such as a tote, may be used by a customer while shopping in a facility. This tote can include one or more weight sensors that are used to determine the weight of items added to or removed from the tote. However, noise can affect the output of the weight sensors, where such noise is attributed to movement or vibration of the tote. Data from a vibration sensor or a motion sensor coupled to the tote can be analyzed to determine noise that is common to weight data and vibration data or motion data associated with the tote. This common noise can then be removed or attenuated from the weight signals to determine de-noised and valid weight data for the tote.

22 Claims, 10 Drawing Sheets

(56) References Cited

U.S. PATENT DOCUMENTS

| | | | | | |
|---|---|---|---|---|---|
| 5,172,783 | A | * | 12/1992 | Feinland | G01G 19/005 |
| | | | | | 177/185 |
| 5,347,092 | A | * | 9/1994 | Buchs | G01G 7/04 |
| | | | | | 177/212 |
| 5,396,206 | A | * | 3/1995 | Herd | H01F 6/065 |
| | | | | | 505/879 |
| 5,789,713 | A | * | 8/1998 | Wakasa | G01G 23/10 |
| | | | | | 177/185 |
| 6,013,879 | A | * | 1/2000 | Nakamura | G01G 23/10 |
| | | | | | 177/199 |
| 6,034,334 | A | * | 3/2000 | Nakamura | G01G 23/10 |
| | | | | | 177/25.18 |
| 6,313,414 | B1 | * | 11/2001 | Campbell | A01D 41/1271 |
| | | | | | 73/1.13 |
| 6,839,697 | B2 | * | 1/2005 | Eaton | G01G 19/005 |
| | | | | | 705/414 |
| 6,987,227 | B2 | * | 1/2006 | Wakasa | G01G 23/10 |
| | | | | | 702/195 |
| 10,948,339 | B1 | * | 3/2021 | Shi | G01G 19/42 |
| 2004/0002927 | A1 | * | 1/2004 | Eaton | G07B 17/00661 |
| | | | | | 705/414 |

* cited by examiner

SYSTEM FOR DETECTING NOISE IN WEIGHT DATA

PRIORITY

This application is a continuation of, and claims priority to, pending U.S. patent application Ser. No. 15/091,048 filed on Apr. 5, 2016, entitled "System for Generating Compensated Weight Data Using Multiple Sensors", which is hereby incorporated by reference in its entirety.

Application Ser. No. 15/091,048 is a continuation of, and claims priority to, abandoned U.S. patent application Ser. No. 14/133,447 filed on Dec. 18, 2013, entitled "System for Generating Compensated Weight Data Using Multiple Sensors". The entirety of this previously filed application is hereby incorporated by reference.

BACKGROUND

Retailers, wholesalers, and other product distributors typically maintain an inventory of various items that may be ordered, purchased, leased, borrowed, rented, viewed, etc. by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas (e.g., shopping area) and customers can pick items from inventory and take them to a cashier for purchase, rental, and so forth. Many of those physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers and the like. In each instance, for an item to be moved from one location to another, it is picked from its current location and transitioned to a new location. It is often desirable to track the transition of inventory, the location of inventory, or both.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
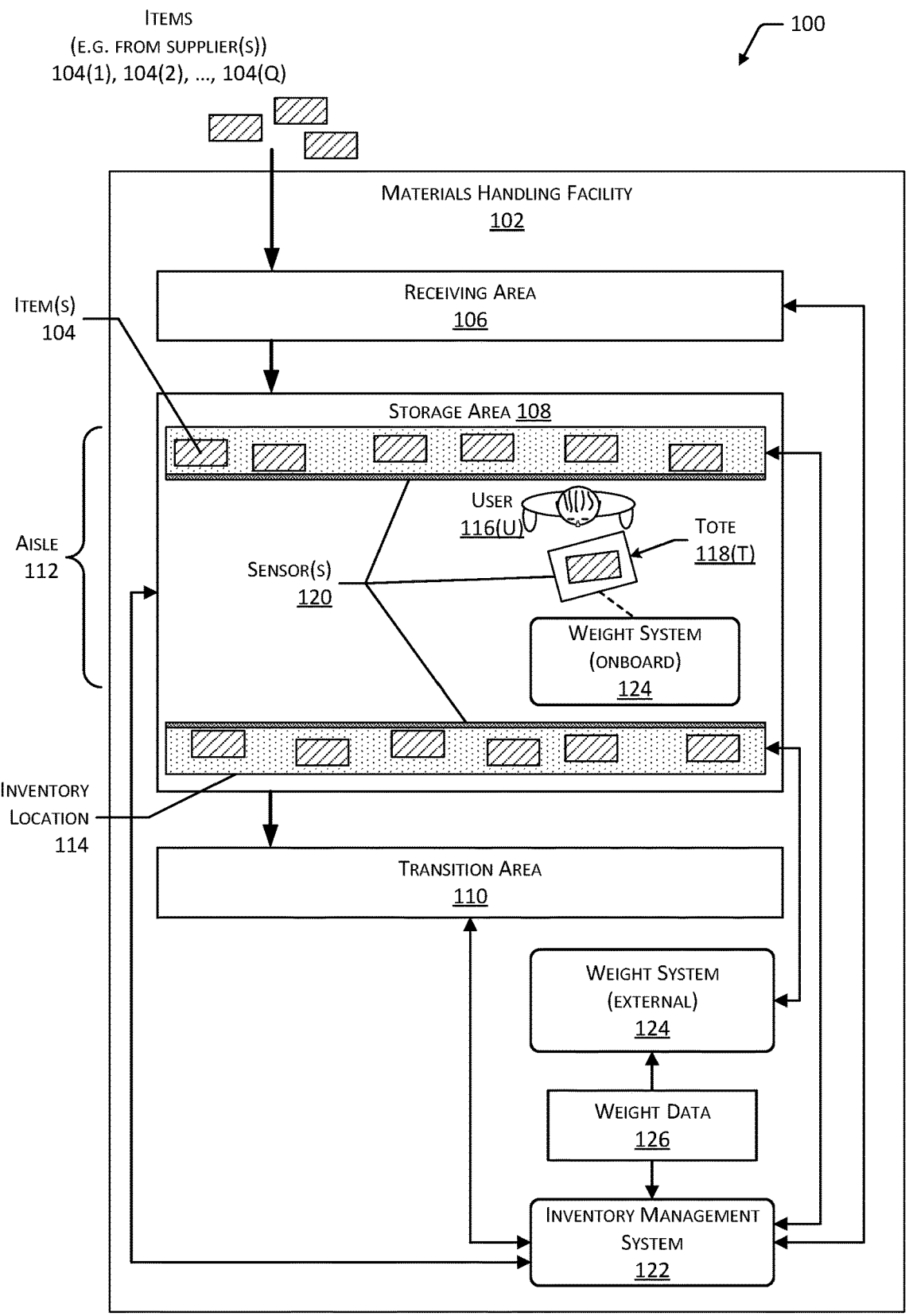
FIG. 1 is a block diagram illustrating a materials handling facility, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for determining a weight of a load. The load may include items such as goods which are stored and moved within a materials handling facility (facility). Weight of a load, such as an item, provides useful information with regard to inventory management. For example, weight may be used to count a number of identical bulk objects, to confirm a particular item has been added or removed from a location, and so forth.

A weight system configured to determine weight of the load may be stationary or mobile. For example, a fixed weight system may be available for users to weigh one or more items. In comparison, a mobile weight system may be mounted on a forklift, tote, vehicle, and so forth, allowing the user to weigh one or more items more conveniently, such as during a pick or place operation.

Traditional mechanisms for determining the weight of a load are prone to incorrect weight readings due to noise. Noise sources in the environment or with respect to the structure supporting the weight system may introduce vibrations or other mechanical impulses which introduce noise into signals produced by weight sensors. Noise sources may include operation of equipment, movement, natural phenomena, and so forth. For example, a noise source may be a heavily laden truck driving by, motion of the weight system itself, thunder, and so forth. The noise may be transmitted mechanically through one or more structures or by the ambient atmosphere to the weight system.

In implementations in which the weight system is stationary, noise in the weight may be encountered from noise sources external to the weight system. For example, the weight system may rest on a table sitting on a concrete slab. Traffic from heavily loaded forklifts driving on the slab nearby may impart vibrations which are conveyed through the slab and the table to the weight system. These vibrations may adversely impact operation of the weight system by introducing noise into the determination of the weight of a load by the weight system, which may produce weight values which are incorrectly high or low.

In implementations in which the weight system is mobile, the weight system may be impacted by external noise sources as described above as well as those relating to motion of the weight system itself, or portions thereof. For example, the weight system may be deployed on a movable tote. The user may place or remove items for weighing by the weight system in the tote while the weight system is in motion. As the tote moves along, it may be stopped, started, bumped, jostled, rolled across an uneven surface, turned, or otherwise subjected to external forces. These external forces may move one or more components of the weight system, the load, or both. These movements may result in unwanted motion of the load with respect to a weight sensor. The unwanted motion may produce noise in an output signal of the weight sensor in the weight system. Subsequently, the noisy output signal may result in an incorrect weight reading.

The weight system is configured with one or more weight sensors configured to determine weight of a load. The weight sensors are configured to provide a signal or data which is indicative of an applied force. As used in this disclosure, the term "signal" may include, but is not limited to, a time-varying analog output. As also used in this disclosure, "data" may include, but is not limited to, information which is digitally represented. In some implementations, the data may be representative of a signal, such as where an analog-to-digital converter has been used. For example, a resistive load cell may be configured to provide a signal which is an analog time varying voltage proportionate to a load upon the load cell.

In one implementation, a plurality of weight sensors may be configured to be subject to the same noise sources. For example, the weight system may be deployed to a tote having two shelves. A first weight sensor measures the weight of a first load of items on the first shelf, while a second weight sensor measures the weight of a second load of items on the second shelf. The first load and the second load may have the same or different weights. The two weight sensors are supported by a common structure, such as a frame of the tote. Due to their support by the common structure, both of the weight sensors are subject to the same noise.

Output from the two weight sensors may be processed to determine a noise signal. For example, the output from the weight sensors may be analyzed in the frequency domain to designate as noise the portions of the output which are common across the output. In another example, the output may be analyzed in the time domain, designating as noise the portions of the output which are common across the output.

The analysis may be performed using analog, digital, or hybrid analog/digital techniques. In one implementation, analog electronic circuitry may be configured to perform a Fourier transform on input signals to provide representations of the signals in a frequency domain. In another implementation, a general purpose computer or digital signal processor may be configured to process data representative of the signals. In some implementations, a weighting or scaling may be applied differentially to the input signals. For example, one signal may be weighted more heavily than another. The input signals may be scaled prior to processing to determine the noise signal.

Once the noise signal has been determined, the output from the weight sensors may be processed to remove or attenuate the noise signal. For example, the noise signal may be subtracted from the weight signal provided by the weight sensor to produce a de-noised weight signal. The resulting de-noised weight signal may be used to determine the weight.

In another implementation, a single weight sensor may be used in conjunction with another sensor configured to generate information indicative of the noise or vibration as imparted on the single weight sensor. For example, a vibration sensor comprising an accelerometer, gyroscope, or both may be affixed to the same structure as the weight sensor and be used to generate information indicative of the noise. Output from the vibration sensor may be compared with the output from the weight sensor to determine the noise signal.

In some implementations, the additional sensor, such as the second weight sensor, the vibration sensor, and so forth, may be at another location from the weight sensor. For example, a vibration sensor may be mounted in the floor of the facility, or a weight sensor on another rack of shelves may be used.

The facility may include, or have access to, an inventory management system. The inventory management system may be configured to maintain information about items within the facility. For example, the inventory management system may maintain information indicative of quantities of items at various inventory locations. This information may be based at least in part upon measuring the weight of one or more items at various places and times within the facility.

The facility may include a material handling facility, library, museum, and so forth. As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

The systems and techniques described herein allow for more accurately determining the weight of a load as measured by one or more weight sensors in the presence of one or more noise sources. By analyzing the output from different sensors which are subject to the same noise source, a noise signal may be determined. Weight signals from the weight sensors may then be processed to remove or attenuate the noise, resulting in a de-noised weight signal which may then be used to determine the weight of the load.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), ..., 104(Q) may be held. As used in this disclosure, letters in parenthesis such as "(Q)" indicate an integer value. The items 104 comprise physical goods, such as books, pharmaceuticals, repair parts, electronic gear, and so forth. Each item 104 has a weight which is indicative of a magnitude of a force on the item due to gravity. For example, weight may be defined as:

$$\text{weight (Newtons)} = m \times g$$

where m is the mass in kilograms (kg) of the item and g is the local gravitational acceleration such as about 9.806 meters/second$^2$. For everyday use on Earth, mass and weight are frequently equated such that an item with a mass of 1 kg may be said to "weigh 1 kg". Weight may thus be expressed in a variety of units which are convenient to use, including but not limited to Newtons, pounds, grams, kg, grains, ounces, tons, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114 may include one or more of shelves, racks, cases, cabinets, bins, floor locations, or other suitable storage mechanisms. The inventory locations 114 may be affixed to the floor or another portion of the facility's structure, or may be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one position within the facility 102 to another.

One or more users 116(1), 116(2), . . . , 116(U) and totes 118(1), 118(2), 118(3), . . . , 118(T) may move within the facility 102. For example, the user 116 may move about within the facility 102 to pick or place the items 104 in various inventory locations 114, placing them on the tote 118 for ease of transport. In other implementations, other agencies such as robots, forklifts, cranes, aerial drones, and so forth, may move about the facility 102 picking, placing, or otherwise moving the items 104.

One or more sensors 120 may be configured to acquire information in the facility 102. The sensors 120 may include, but are not limited to, weight sensors, vibration sensors, radio frequency (RF) receivers, imaging devices, temperature sensors, humidity sensors, and so forth. The sensors 120 may be stationary or mobile, relative to the facility 102. For example, the inventory locations 114 may contain weight sensors configured to determine a weight of items 104 on shelves, the tote 118 may contain weight sensors to determine a weight of items 104 carried by the tote 118, and so forth. In another example, the floor of the facility 102 may include weight sensors configured to determine a weight of the user 116 or other object thereupon.

During operation of the facility 102, the sensors 120 may be configured to provide information suitable for tracking how the items 104 move within the facility 102. For example, a decrease in weight of a load on a shelf of the inventory location 114 may indicate removal of an item 104 while a corresponding increase in weight of a load on the tote 118 may indicate placement of the item 104. The sensors 120 are discussed in more detail below with regard to FIG. 2.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 is depicted functionally rather than schematically. For example, in some implementations, multiple different receiving areas 106, storage areas 108, and transition areas 110 may be interspersed rather than segregated.

The facility 102 may include, or be coupled to, an inventory management system 122. The inventory management system 122 is configured to interact with users or devices such as sensors, robots, material handling equipment, computing devices, and so forth in one or more of the receiving area 106, the storage area 108, or the transition area 110.

The facility 102 may be configured to receive different kinds of items 104 from various suppliers, and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item, depending on the nature of the enterprise that operates the facility 102.

Upon being received from a supplier at receiving area 106, the items 104 may be prepared for storage. For example, in some implementations, items 104 may be unpacked, or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106 items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 were items 104 are transitioned from one location to another, or from one entity to another. For example, the transition area 110 may be a packing station within the facility 102. When the item 104 arrives at the transition area 110, the items 104 may be transitioned from the storage area 108 to the packing station. Information about the transition may be maintained by the inventory management system 122.

In another example, if the items 104 are departing the facility 102 a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102.

The facility 102 includes, or has access to, one or more weight systems 124. The weight system 124 is configured to use input from at least one weight sensor and one or more sensors 120 to generate weight data 126. The weight data 126 may include one or more of weight information, time the weight was acquired, information identifying the weight sensor used, and so forth. The weight sensor provides a signal associated with the weight of a load, but this signal may include noise. The one or more other sensors 120 provide a signal which also includes the noise. By performing an analysis of at least two signals, the weight system 124 is able to generate a de-noised weight signal. The de-noised weight signal may then be used to determine the weight which is indicative of the load and not the noise. Based on the weight from the de-noised weight signal, the weight system 124 may generate the weight data 126.

The noise experienced by the sensors 120 used by the weight system 124 may result from operation of equipment, movement, natural phenomena, and so forth. For example, a noise source may be a pump, motion of the tote 118, thunder, and so forth. The noise may be transmitted mechanically through one or more structures or by the ambient atmosphere to the sensors 120 used by the weight system 124.

The noise sources may produce vibration or other motion of the load, the sensor 120 weighing the load, or both. For example, the weight system 124 onboard the tote 118 may attempt to determine a weight of the item 104 placed thereon, while the tote 118 is being rolled across a cracked and uneven concrete floor. As the tote 118 is bumped or otherwise upset by the floor, the mechanical impulses associated with those bumps are conducted from the wheels up through a frame of the tote 118 to the weight sensor and the load of the item 104. The jostling to which the item 104 is subjected may cause transient accelerations of the item 104, resulting in a noisy signal from the sensor 120 which includes the noise. As a result of the noisy signal, the weight data derived therefrom may be incorrect, such as indicating a weight of the item 104 which is greater or less than that of the item 104.

The weight system 124 may be implemented as hardware which may be installed within other devices, such as the inventory locations 114, totes 118, and so forth to generate weight data 126. In other implementations, the weight system 124 may be implemented as software stored in computer-readable storage media and configured to execute on a hardware processor to generate the weight data 126 based on the de-noised weight signal.

The weight system 124 may operate in conjunction with the inventory management system 122 or other systems. For example, the inventory management system 122 may be configured to track the movement of items 104 based at least in part on weight data 126 provided by the weight system 124. Continuing the example, the inventory management system 122 may receive weight data 126(1) from a first weight system 124(1) configured to measure the weight of the inventory location 114 indicating the load on a shelf has decreased by 2.4 kg at time 14:11:03. The inventory management system 122 may then receive weight data 126(2) from a second weight system 124(2) onboard the tote 118 indicating the load on the tote 118 has increased by 2.4 kg at time 14:11:55. The inventory management system 122 may be configured to determine that, based on the matching weight and the close correspondence in time, an item 104 weighing 2.4 kg has moved from the shelf of the inventory location 114 to the tote 118.

Figure 2:
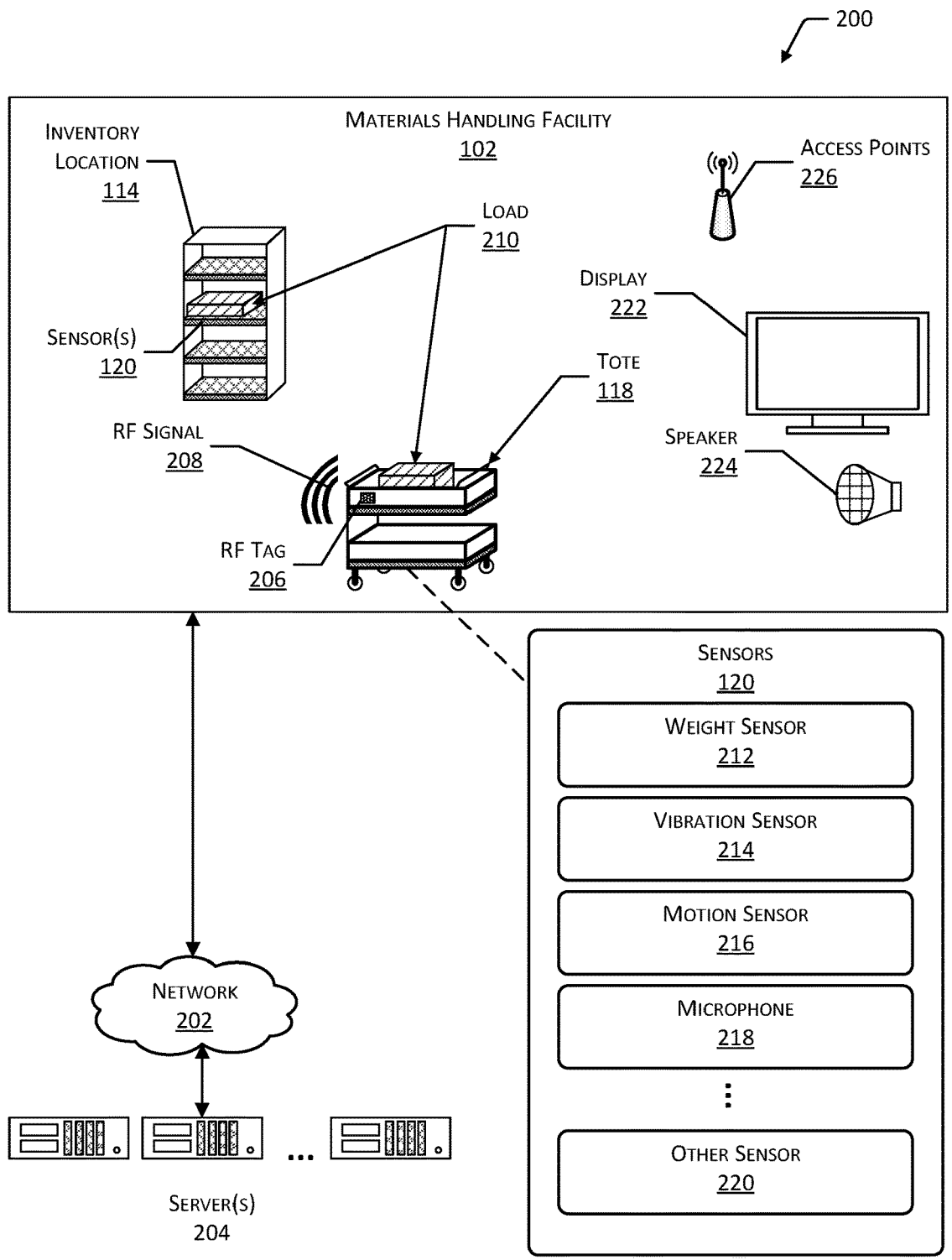
FIG. 2 is a block diagram illustrating additional details of the materials handling facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks. The network 202 may be implemented using wired infrastructure (e.g., copper cable, fiber optic cable, and so forth), a wireless infrastructure (e.g., cellular, microwave, satellite), or other connection technologies.

The servers 204 may be configured to execute one or more modules or software applications associated with the inventory management system 122, the weight system 124, and so forth. While the servers 204 are illustrated as being in a location outside of the facility 102, in other implementations at least a portion of the servers 204 may be located at the facility 102. The servers 204 are discussed in more detail below with regard to FIG. 3.

The totes 118 or other objects in the facility 102 may be equipped with one or more RF tags 206. The RF tags 206 are configured to emit an RF signal 208. In one implementation, the RF tag 206 may be a radio frequency identification (RFID) tag configured to emit the RF signal 208 upon activation by an external signal. For example, the external signal may comprise a radio frequency signal or a magnetic field configured to energize or activate the RFID tag. In another implementation, the RF tag 206 may comprise a transmitter and a power source configured to power the transmitter. For example, the RF tag 206 may comprise a Bluetooth Low Energy (BLE) transmitter and battery. In other implementations, the tag may use other techniques to indicate presence. For example, an acoustic tag may be configured to generate an ultrasonic signal which is detected by corresponding acoustic receivers.

Objects within the facility 102 may be equipped with RF tags 206. The inventory management system 122 may be configured to use the RF tags 206 for one or more of identification of the object, determining a position of the object, and so forth. For example, the users 116 may wear RF tags 206, the totes 118 may have RF tags 206 affixed, and so forth. The tote 118 is configured to carry or otherwise transport one or more items 104. For example, the tote 118 may include a basket, a cart, a bag, and so forth.

The inventory locations 114, the totes 118, the floor, or other structures in the facility 102 may support a load 210. The load 210 may be a mass for which a weight is being determined. The load 210 may include items 104 as well as portions of a structure or mechanism. For example, the load 210 may include a weighing pan and the items 104 in the weighing pan.

Generally, the inventory management system 122, the weight system 124, or other systems associated with the facility 102 may include any number and combination of input components, output components, and servers 204.

The one or more sensors 120 may be arranged at one or more locations within the facility 102. The sensors 120 may include, but are not limited to, a weight sensor 212, a vibration sensor 214, a motion sensor 216, a microphone 218, or other sensors 220.

The weight sensor 212 is configured to provide a signal indicative of a weight of the load 210. As described above, the weight is an indication of the force exerted by gravity on the load 210. However, the weight sensor 212 may be subject to external noise such as transient accelerations to the weight sensor 212, the load 210, or both which may result in a relative displacement of the weight sensor 212 with respect to load 210.

The weight sensor 212 may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers which generate one or more signals based on an applied force, such as that of the load 210 due to gravity.

In some implementations, the sensing mechanism may be incorporated into an assembly which may include other components. The assembly may be referred to as a "load cell".

In one example, the weight sensor 212 may employ a load cell which includes a strain gauge which is affixed to a portion of a structure or other mechanical component such as a block which may be configured to support a portion of the load 210. Deformation of the block based on the weight of the load 210 changes one or more electrical characteristics (such as electrical resistance, capacitance, inductance, and so forth) of the strain gauge. These changes may be used to generate a signal which is indicative of the weight.

In another example, the weight sensor 212 may include a potentiometric device in which the weight of the load 210 is supported by a spring to which a wiper is attached. As the weight of the load 210 increases, the wiper moves changing electrical resistance of a circuit, which may be used to generate the signal indicative of the weight.

In yet another example, the sensing mechanism may use optical fibers affixed to, or embedded within, a support structure to form a load cell. As weight is applied to the support structure, the optical fibers are distorted and the distortion may be used to generate a signal indicative of the weight.

Depending upon the nature of the sensing mechanism, the signal may be electrical, magnetic, optical, pneumatic, hydraulic, and so forth. The weight sensor 212 may comprise other circuitry, such as a power regulator, signal conditioner, analog-to-digital converter, and so forth.

The vibration sensor 214 is configured to provide output which is indicative of mechanical vibration levels. The vibration sensor 214 may include one or more accelerometers configured to measure dynamic acceleration of the vibration sensor 214 or the structure to which it is affixed. In some implementations the vibration sensor 214 may operate in a noncontact mode. For example, the vibration sensor 214 may include a laser and appropriate optics configured to measure the vibration of an object at a distance.

The motion sensor 216 is configured to provide output which is indicative of rotation, translation, or a combination thereof, of the motion sensor 216 and the structure to which it is affixed. The motion sensor 216 may include, but is not limited to, gyroscopes, tilt sensors, accelerometers, and so forth.

The microphone 218 is configured to provide output indicative of a sound. For example, the microphone 218 may be configured to detect frequency below a threshold level which is associated with noise in the weight system 124. The microphone 218 may be configured to detect sounds which are one or more of infrasonic, within the audible range of humans, or ultrasonic.

The other sensors 220 may include one or more of imaging devices, microbolometers, infrared detectors, proximity detectors, range cameras, thermometers, touch sensors, pressure sensors, Interpolating Force-Sensitive Resistance (IFSR) sensors, radio frequency (RF) receivers, biometric input devices, and so forth. For example, the RF receivers may be configured to detect the RF signal 208 emitted by the RF tag 206, or RF signals 208 from other devices. For example, the RF receivers may be configured to receive data transmitted by the RF tag 206, such as a tag identifier. The other sensors 220 may include other components capable of receiving input about the environment.

The facility 102 may also include output devices. These output devices are configured to present information to users 116 or otherwise provide output to the surrounding environment. In the implementation depicted here, the facility 102 may include a display 222. The display 222 may include electronically addressable displays configurable to present a visual image. For example, the display 222 may include projectors, liquid crystal displays, cathode ray tubes, plasma displays, and so forth. One or more speakers 224 may also be available to present audible output. Other output devices (not depicted) may also be present, such as printers, haptic output devices, and so forth.

The facility 102 may include one or more access points 226 configured to establish one or more wireless networks. The access points 226 may use Wi-Fi, near field communication (NFC), Bluetooth, or other technologies to establish wireless communications between a device and the network 202. The wireless networks allow the devices to communicate with one or more of the inventory management system 122, the weight system 124, the sensors 120, the RF tag 206, a communication device of the tote 118, or other devices.

Figure 3:
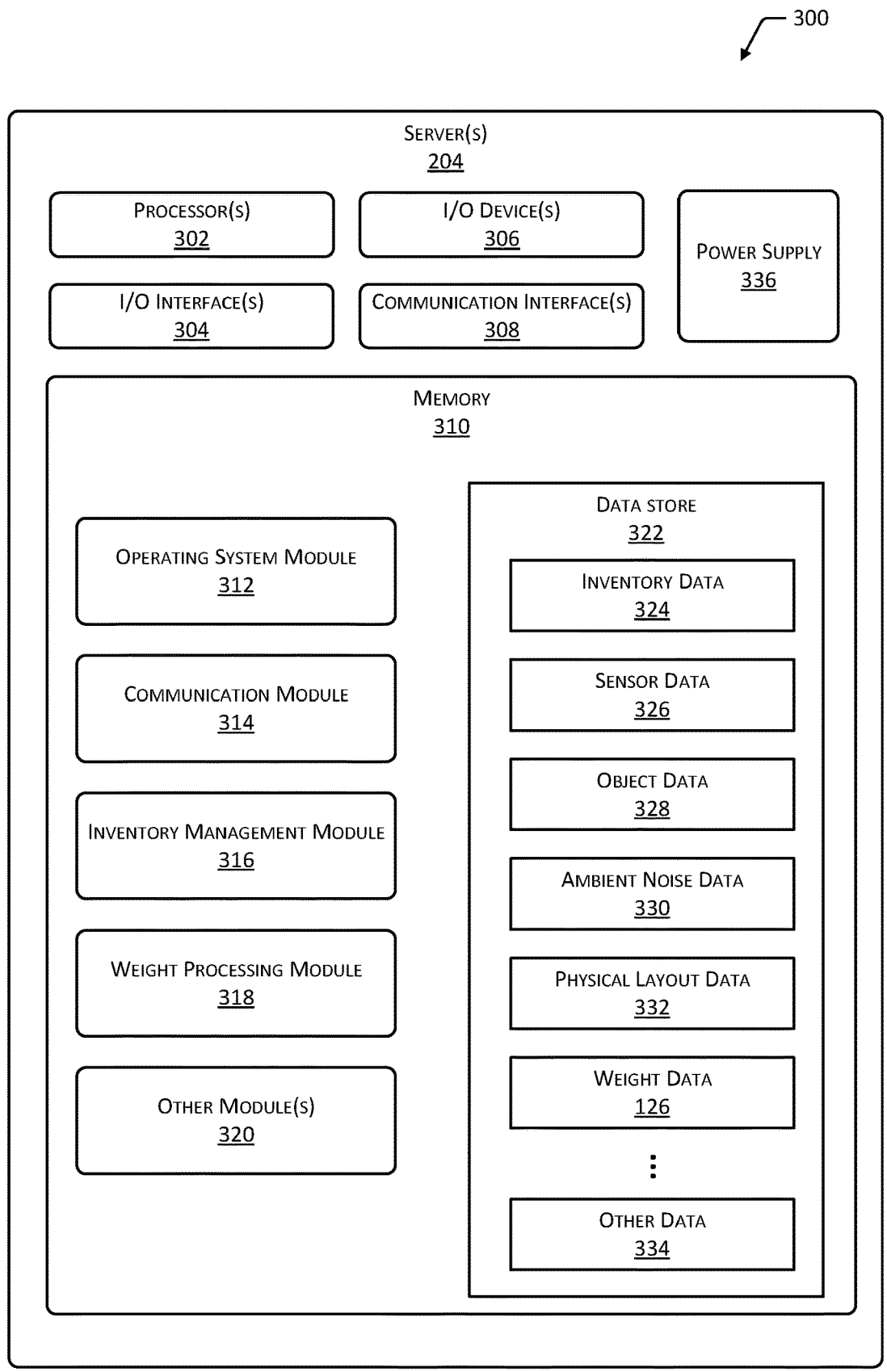
FIG. 3 illustrates a block diagram of a server configured to support operation of the facility, according to some implementations.

FIG. 3 illustrates a block diagram 300 of the server 204. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing," "software as a service (SaaS)," "platform computing," "network-accessible platform," "cloud services," "data centers" and so forth. Services provided by the server 204 may be distributed across one or more physical or virtual devices.

The server 204 may include one or more hardware processors 302 (processors) configured to execute one or more stored instructions. The processors 302 may comprise one or more cores. The server 204 may include one or more input/output (I/O) interface(s) 304 to allow the processor 302 or other portions of the server 204 to communicate with other devices. The I/O interfaces 304 may comprise inter-integrated circuit (I2C), serial peripheral interface bus (SPI), Universal Serial Bus (USB) as promulgated by the USB Implementers Forum, RS-232, and so forth.

The I/O interface(s) 304 may couple to one or more I/O devices 306. The I/O devices 306 may include input devices such as one or more of a keyboard, mouse, scanner, and so forth. The I/O devices 306 may also include output devices such as one or more of a display, printer, audio speakers, and so forth. In some embodiments, the I/O devices 306 may be physically incorporated with the server 204 or may be externally placed.

The server 204 may also include one or more communication interfaces 308. The communication interfaces 308 are configured to provide communications between the server 204 and other devices, such as the sensors 120, routers, the access points 226, and so forth. The communication interfaces 308 may include devices configured to couple to personal area networks (PANS), wired and wireless local area networks (LANs), wired and wireless wide area networks (WANs), and so forth. For example, the communication interfaces 308 may include devices compatible with Ethernet, Wi-Fi, and so forth.

The server 204 may also include one or more busses or other internal communications hardware or software that allow for the transfer of data between the various modules and components of the server 204.

As shown in FIG. 3, the server 204 includes one or more memories 310. The memory 310 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the server 204. A few example functional modules are shown stored in the memory 310, although the same functionality may alternatively be implemented in hardware, firmware, or as a system on a chip (SOC).

The memory 310 may include at least one OS module 312. The OS module 312 is configured to manage hardware resource devices such as the I/O interfaces 304, the I/O devices 306, the communication interfaces 308, and provide various services to applications or modules executing on the processors 302. The OS module 312 may implement a variant of the FreeBSD operating system as promulgated by the FreeBSD Project, other UNIX or UNIX-like variants, a variation of the Linux operating system as promulgated by Linus Torvalds, the Windows Server operating system from Microsoft Corporation of Redmond, Wash., and so forth.

Also stored in the memory 310 may be one or more of the following modules. These modules may be executed as foreground applications, background tasks, daemons, and so forth.

A communication module 314 may be configured to establish communications with one or more of the sensors 120, other servers 204, or other devices. The communications may be authenticated, encrypted, and so forth.

The memory 310 may store an inventory management module 316. The inventory management module 316 is configured to provide the inventory functions as described herein with regard to the inventory management system 122. For example, the inventory management module 316 may track items 104 between different inventory locations 114.

The memory 310 may also store a weight processing module 318 configured to provide the weight data 126 as described herein with regard to the weight system 124. The weight processing module 318 is configured to access sensor data received from the one or more sensors 120 and generate the weight data 126. In some implementations, the weight processing module 318 may use one or more techniques to determine a noise signal and remove or attenuate the noise signal from a weight signal provided by one or more weight sensors 212. Operation of the weight processing module 318 and the techniques used to generate the weight data 126 are discussed below in more detail.

Other modules 320 may also be present in the memory 310. For example, a weight and balance module may be configured to direct placement of the items 104 on the inventory locations 114, the totes 118, and so forth to avoid overloading those structures.

The memory 310 may also include a data store 322 to store information. The data store 322 may use a flat file, database, linked list, tree, executable code, script, or other data structure to store the information. In some implementations, the data store 322 or a portion of the data store 322 may be distributed across one or more other devices including other servers 204, network attached storage devices and so forth.

The data store 322 may include inventory data 324. The inventory data 324 may comprise information associated with the items 104. The information may include one or more inventory locations 114, at which one or more of the items 104 are stored. The inventory data 324 may also include price, quantity on hand, weight, expiration date, and so forth. The inventory management module 316 may store information associated with inventory management functions in the inventory data 324.

The data store 322 may also store sensor data 326 as generated by the one or more sensors 120. For example, sensor data 326 may include information representative of the output signals from a weight sensor 212 and a vibration sensor 214, where the output signals include noise. The weight processing module 318 may access the sensor data 326.

Object data 328 may also be stored in the data store 322. The object data 328 comprises information associated with objects found in the facility 102. The objects may include the users 116, the totes 118, robots, equipment, and so forth. The information may include type of object, RF tag identifier, object size data, identification characteristics, and so forth. For example, the object data 328 may indicate that the object is a user 116, is associated with the RF tag identifier of "Z93", and that the user 116 weighs between 160 and 180 pounds. Continuing the example, the object data 328 may also associate the object with a particular user account, device account, and so forth.

Ambient noise data 330 may be stored in the data store 322. The ambient noise data 330 includes information associated with the noise and noise sources of the facility 102. The ambient noise data 330 may comprise one or more of frequency profiles, times of occurrence, location of source, area affected, intensity, and so forth. For example, the ambient noise data 330 may indicate that a designated section within a particular aisle 112 exhibits noise centered at 60 Hz and which corresponds to operation of the heating ventilation and air conditioning (HVAC) unit in that area. In some implementations, the ambient noise data 330 may be updated based on input from one or more other devices, such as a controller of, or a sensor coupled to, the noise source 504. Continuing the example, the HVAC unit may be configured to provide the weight system 124 with notification that the HVAC is in operation.

In another example, the ambient noise data 330 may designate a particular portion of the facility 102 which has rough concrete flooring as a noise source and store information associated with the noise encountered by a weight sensor 212 on the tote 118 while traveling over the rough flooring. In yet another example, the ambient noise data 330 may include information such as a schedule of a nearby passing freight train which regularly produces noise in the facility 102. In some implementations, the weight processing module 318 may use the ambient noise data 330 to generate the weight data 126.

Physical layout data 332 may also be stored in the data store 322. The physical layout data 332 provides a mapping between different devices, such as the sensors 120, and physical positions within the facility 102. For example, the physical layout data 332 may indicate the coordinates within the facility 102 at which stationary or mobile vibration sensors 214 are located at a particular time.

The weight system 124 may access the physical layout data 332 as part of the process to generate the weight data 126. For example, the weight processing module 318 may be configured to determine one or more sensors 120 which are physically located proximate to a weight sensor 212. Based on this information, the weight processing module 318 may use the sensor data 326 from those sensors 120 to generate the weight data 126.

As described above, the weight data 126 may include one or more of weight information, time the weight was acquired, information identifying the weight sensor 212 used, margin of error for the measurement, and so forth. For example, the weight data 126 may indicate that a weight of 2.4 kg was measured at time 14:11:03, from weight sensor 212(47), with a margin of error of plus or minus 0.2 kg.

The data store 322 may store other data 334 as well, such as user preferences, configuration files, permissions associated with user accounts, and so forth.

The server 204 may also include a power supply 336. The power supply 336 is configured to provide electrical power suitable for operating the components in the server 204.

Figure 4:
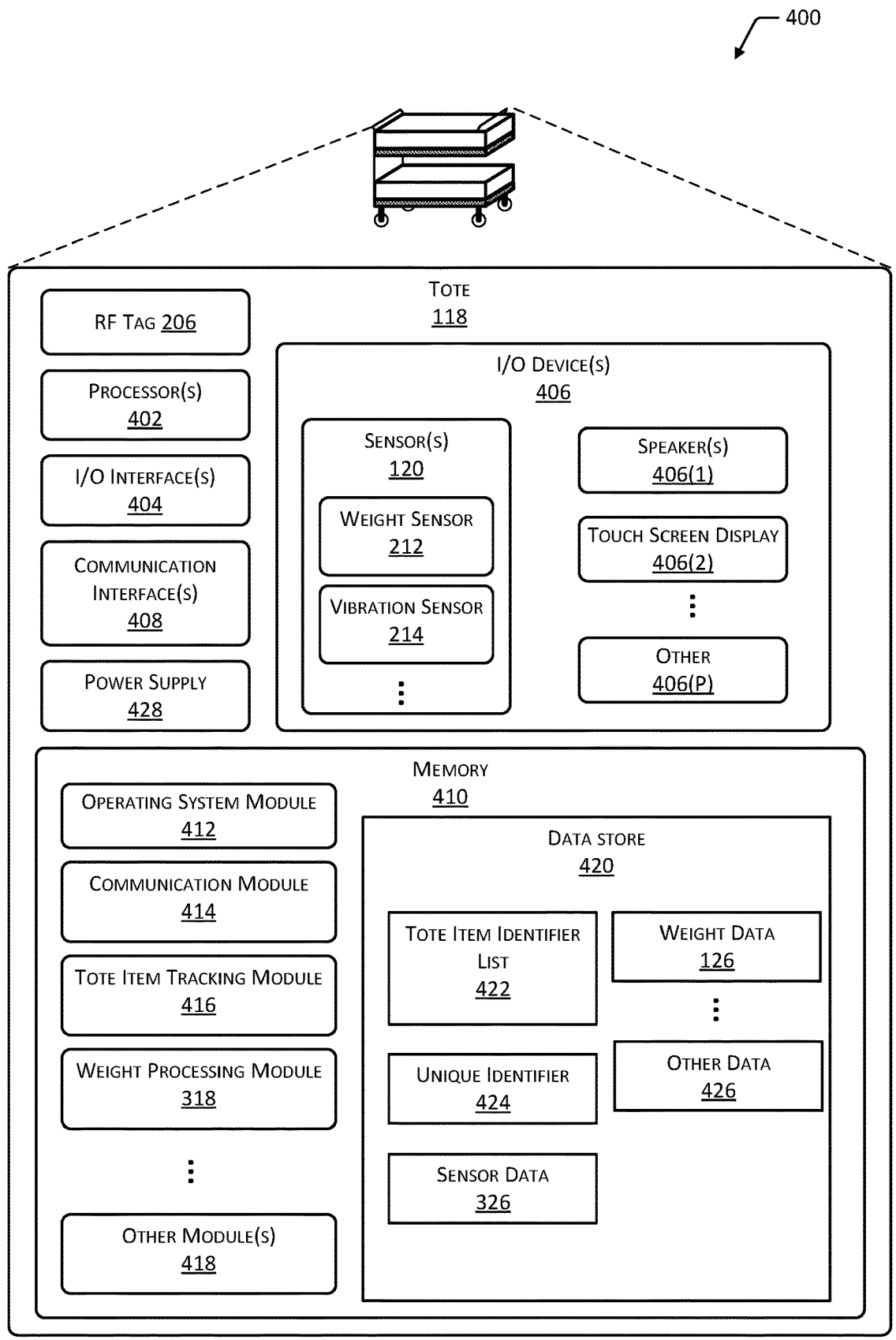
FIG. 4 is a block diagram of a tote, according to some implementations.

FIG. 4 illustrates a block diagram 400 of the tote 118, according to some implementations. The tote 118 may include an RF tag 206. The RF tag 206 may be affixed to, integral with, or is otherwise associated with the tote 118. In some implementations, the tote 118 may have identifiers, tags, or other indicia thereupon. For example, a machine-readable optical code, such as a barcode, may be affixed to a side of the tote 118.

The tote 118 may include one or more hardware processors 402 (processors) configured to execute one or more stored instructions. The processors 402 may comprise one or more cores. The tote 118 may include one or more I/O interface(s) 404 to allow the processor 402 or other portions of the tote 118 to communicate with other devices. The I/O interfaces 404 may include I2C, SPI, USB, RS-232, and so forth.

The I/O interface(s) 404 may couple to one or more I/O devices 406. The I/O devices 406 may include one or more of the input devices such as the sensors 120. As described above, the sensors 120 may include weight sensors 212, vibration sensors 214, and so forth. Other input devices may include RFID readers, NFC readers, barcode scanners, fingerprint readers, and so forth. The I/O devices 406 may also include output devices such as one or more of a display, audio speakers 406(1), haptic output devices and so forth. In some implementations input and output devices may be combined. For example, a touchscreen display 406(2) may incorporate a touch sensor and a display device. In some embodiments, the I/O devices 406 may be physically incorporated with the tote 118 or may be externally placed.

The tote 118 may also include one or more communication interfaces 408. The communication interfaces 408 are configured to provide communications between the tote 118 and other devices, such as other totes 118, routers, access points, the servers 204, and so forth. The communication interfaces 408 may include devices configured to couple to PANs, LANs, WANs, and so forth. For example, the communication interfaces 408 may include devices compatible with Ethernet, Wi-Fi, Bluetooth, ZigBee, and so forth.

The tote 118 may also include one or more busses or other internal communications hardware or software that allow for the transfer of data between the various modules and components of the tote 118.

As shown in FIG. 4, the tote 118 includes one or more memories 410. The memory 410 comprises one or more CRSM as described above. The memory 410 provides storage of computer readable instructions, data structures, program modules and other data for the operation of the tote 118. A few example functional modules are shown stored in the memory 410, although the same functionality may alternatively be implemented in hardware, firmware, or as a SOC.

The memory 410 may include at least one OS module 412. The OS module 412 is configured to manage hardware resource devices such as the I/O interfaces 404, the I/O devices 406, the communication interfaces 408, and provide various services to applications or modules executing on the processors 402. The OS module 112 may implement a variant of the FreeBSD operating system as promulgated by the FreeBSD Project, other UNIX or UNIX-like variants, a variation of the Linux operating system, such as Android as promulgated by Google, Inc. of Mountain View, Calif. Other OS modules 412 may be used, such as the Windows operating system from Microsoft Corporation of Redmond, Wash., the LynxOS from LynuxWorks of San Jose, Calif., and so forth.

Also stored in the memory 410 may be one or more of the following modules. These modules may be executed as foreground applications, background tasks, daemons, and so forth.

A communication module 414 may be configured to establish communications with one or more of the sensors 120, servers 204, or other devices. The communications may be authenticated, encrypted, and so forth.

The memory 410 may also store a tote item tracking module 416. The tote item tracking module 416 is configured to maintain a list of items 104, which are associated with the tote 118. For example, the tote item tracking module 416 may receive input from a user 116 by way of a touch screen display with which the user 116 may enter information indicative of the item 104 placed in the tote 118. In another example, the tote item tracking module 416 may receive input from the I/O devices 406, such as the weight sensor 212 and an RFID or NFC reader. The tote item tracking module 416 may send the list of items 104 to the inventory management system 122. The tote item tracking module 416 may also be configured to receive information from the inventory management system 122. For example, a list of items 104 to be picked may be presented within a user interface on the display device of the tote 118.

The memory 410 may include a weight processing module 318. As described above, the weight processing module 318 is configured to access sensor data 326 received from the one or more sensors 120 and generate the weight data 126. The weight processing module 318 may use one or more techniques to remove or attenuate the noise signal from a weight signal provided by one or more weight sensors 212. In some implementations, the weight processing module 318 may be omitted, and the sensor data 326 may be provided to another device, such as the server 204.

Other modules 418 may also be stored within the memory 410. In one implementation, a user authentication module may be configured to receive input and authenticate or identify a particular user 116. For example, the user 116 may enter a personal identification number or may provide a fingerprint to the fingerprint reader to establish their identity.

The memory 410 may also include a data store 420 to store information. The data store 420 may use a flat file, database, linked list, tree, executable code, script, or other data structure to store the information. In some implementations, the data store 420 or a portion of the data store 420 may be distributed across one or more other devices including the servers 204, other totes 118, network attached storage devices and so forth.

The data store 420 may store a tote item identifier list 422. The tote item identifier list may comprise data indicating one or more items 104 associated with the tote 118. For example, the list may indicate the items 104 which are present in the tote 118. The tote item tracking module 416 may generate or otherwise maintain a tote item identifier list 422.

A unique identifier 424 may also be stored in the memory 410. In some implementations, the unique identifier 424 may be stored in rewritable memory, write-once-read-only memory, and so forth. For example, the unique identifier 424 may be burned into a one-time programmable non-volatile memory, such as a programmable read-only memory (PROM). In some implementations, the unique identifier 424 may be part of a communication interface 408. For example, the unique identifier 424 may comprise a media access control address associated with a Bluetooth interface.

The data store 420 may also store sensor data 326. The sensor data 326 may be acquired from the onboard sensors 120 of the tote 118. The weight data 126 produced by the weight processing module 318 may also be stored in the data store 420.

Other data 426 may also be stored within the data store 420. For example, tote configuration settings, user interface preferences, and so forth may also be stored.

The tote 118 may also include a power supply 428. The power supply 428 is configured to provide electrical power suitable for operating the components in the tote 118. The power supply 428 may comprise one or more of photovoltaic cells, batteries, wireless power receivers, fuel cells, capacitors, and so forth.

In some implementations, the tote 118 may also include circuitry configured to support the generation of weight data 126. In some implementations, the weight system 124 as implemented on the tote 118 may include one or more analog, digital, or hybrid analog and digital circuits. These circuits may be discrete components, application-specific integrated circuits, mixed-signal processing devices, field programmable analog arrays (FPAA), field programmable gate arrays (FPGA), digital signal processors (DSP), and so forth. These are discussed in more detail below with regard to the following figures.

Figure 5:
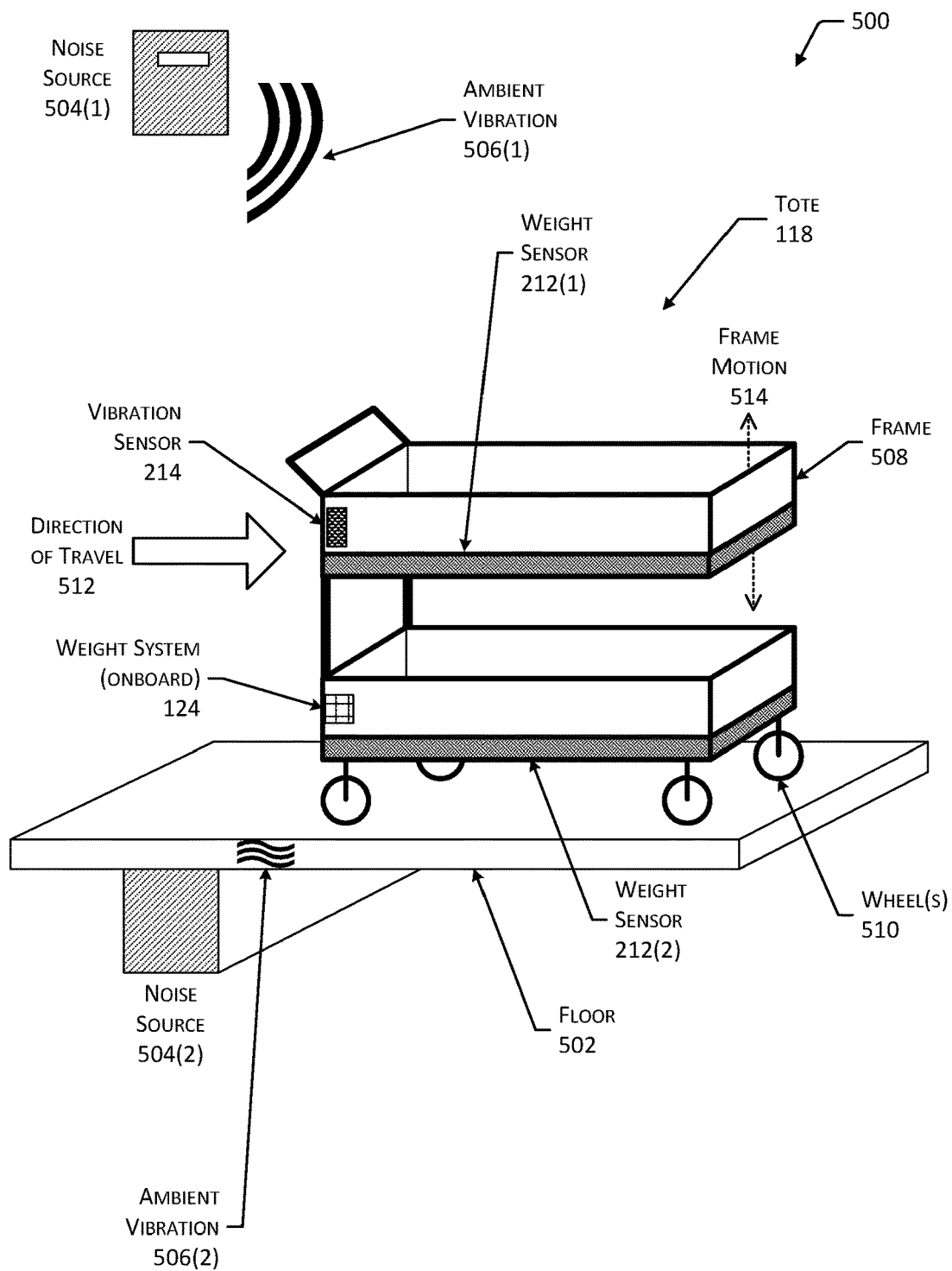
FIG. 5 illustrates a portion of the facility and the tote, according to some implementations.

FIG. 5 illustrates a portion 500 of the facility 102 and the tote 118, according to some implementations. A portion of a floor 502 of the facility 102 is depicted. For example, the floor 502 may comprise concrete, wood, a metal deck, and so forth. A noise source 504 may produce an ambient vibration 506. This may comprise a vibration in one or more of a solid, liquid, or a gas. As described above, the noise sources 504 may include natural or artificial sources of mechanical vibrations, or other motion. Shown here are two noise sources 504(1) and 504(2). The noise source 504(1) may be an HVAC duct in which a low-frequency resonance has occurred and a corresponding high amplitude and low frequency ambient vibration 506(1) in the air results. The noise source 504(2) may be a motor which is out of balance and produces the ambient vibration 506(2). Because a casing of the motor is mounted to the floor 502, the ambient vibration 506(2) is transmitted into and throughout at least a portion of the floor 502.

Supported by the floor 502 is the tote 118. The tote 118 may include a frame 508 or other structure. For example, the frame 508 may comprise one or more of metal, plastic, ceramic, or composite materials. The frame 508 may be substantially rigid sufficient to carry one or more items 104.

The frame 508 may support one or more weight sensors 212. For example, as illustrated here, the frame 508 forms an upper platform and a lower platform. A first weight sensor 212(1) is provided for the upper platform and a second weight sensor 212(2) is provided for the lower platform. Each platform is coupled to the respective weight sensor 212 such that a weight signal may be generated when a load 210 is placed on the respective platform.

One or more wheels 510 may be attached to the frame 508. The user 116 or another agency such as a robot may push or pull the tote 118 to move the tote 118 throughout the facility 102. For example, as illustrated here the tote 118 may be in motion along a direction of travel 512. While the tote 118 is in use, in motion, or both, the frame 508, the platforms, and the weight sensors 212 may be subjected to forces applied thereto. For example, irregularities in the floor 502 may result in transient acceleration of the frame 508 as the wheels 510 travel over these irregularities. Similarly, the direction of travel 512 may curve such as when the user 116 turns the tote 118 to the left or right. In another example, the user 116 may drop an item 104 onto the upper platform. As a result, in some situations, frame motion 514 may occur. For example, as depicted here a leading edge of the tote 118 may oscillate vertically.

The motions of the frame 508, regardless of their source being the noise sources 504, the frame motion 514, or both, may introduce noise into the output of the weight sensors 212. As described above, the weight system 124 may be configured to determine the noise present in the output of the weight sensor 212 and produce a de-noised weight signal from which the weight of the load 210 may be determined.

The weight system 124 may determine the noise signal by comparing the output from two or more sensors 120. In one implementation, the weight system 124 may use the output from two separate weight sensors 212 which are both affected in some fashion by the noise. The outputs from the respective weight sensors 212 may be compared to find commonalities which may then be designated at least in part as noise. In another implementation, the weight system 124 may use the output from a weight sensor 212 and another type of sensor, such as a vibration sensor 214 which is also affected in some fashion by the noise. For example, as depicted here the vibration sensor 214 may be affixed to the same frame 508 as the weight sensor 212(1). Similarly, the output from the weight sensor 212(1) and the vibration sensor 214 may be compared to find commonalities which may then be designated at least in part as noise. This determination is discussed in more detail below in the following figures.

In some implementations, the tote 118 may have at least a portion of the weight system 124 on board. For example, the onboard weight system 124 may comprise analog and digital circuitry configured to generate the de-noised weight signal and interpret the de-noised weight signal as a weight.

In other implementations, other configurations of totes 118 may be used. For example, the tote 118 may comprise a single platform, may have more than two platforms, may be fully enclosed, and so forth. Some of the same structures and components may also be found in the inventory locations 114. For example, stationery shelving may be equipped with weight sensors 212 such that weight of a load 210 on the shelf or a portion thereof may be determined.

Figure 6:
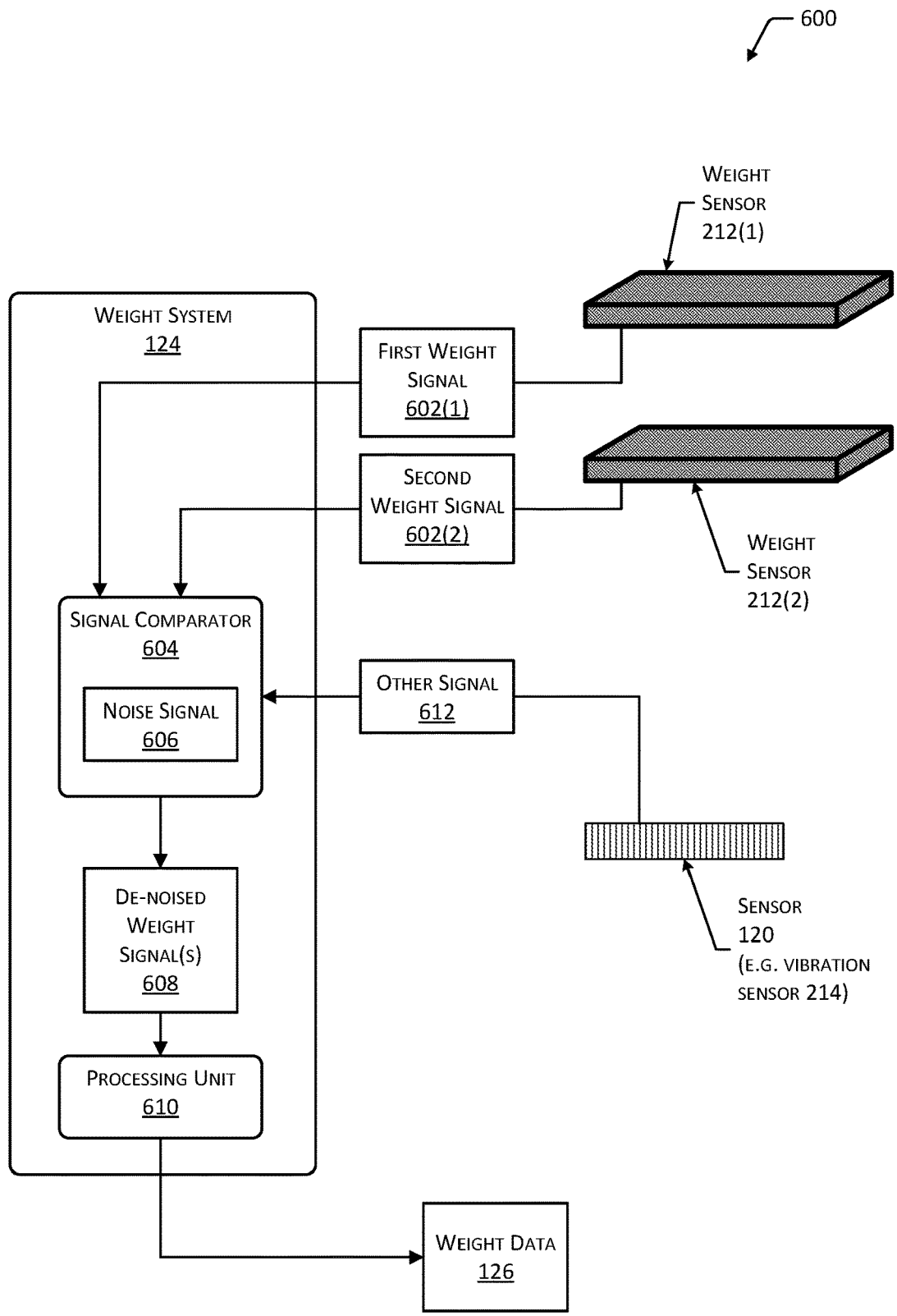
FIG. 6 illustrates a weight system using analog processing to determine weight, according to some implementations.

FIG. 6 illustrates an implementation 600 of the weight system 124 using analog processing to generate the weight data 126. As described above, the weight system 124 is configured to determine and compensate for noise in the output from one or more weight sensors 212 by using output from another weight sensor 212 or other sensor 120 such as a vibration sensor 214.

As illustrated here a first weight sensor 212(1) produces a first weight signal 602(1) while a second weight sensor 212(2) produces a second weight signal 602(2). As described above, the weight signals 602 include the information indicative of the weight of the load 210 on the respective weight sensor 212, as well as noise.

The weight signals 602 may be provided to a signal comparator 604. In some implementations the signal comparator 604 may comprise analog circuitry such as one or more operational amplifiers (op amps), a two-dimensional rectangular lattice of inductors and capacitors, filters, and so forth. In some implementations, the signal comparator 604 may be configured to determine a noise signal 606 by transforming and analyzing inputs in the frequency domain, the time domain, or both.

The noise signal 606 is representative of the noise produced outside of the mechanism of the weight sensor 212 and associated circuitry. For example, the noise signal 606 may not include instrumentation noise, quantization noise, drift, and so forth which may result from operation of the weight sensor 212.

The weight signals 602 may express information in the time domain. The signal comparator 604 may perform a transform on the weight signals 602 such as a Fourier or Laplace transform, to produce frequency domain information from the time domain information. In one implementation, a discrete Fourier transform, or an approximation of a discrete Fourier transform may be used. The information in the frequency domain may be compared to determine frequencies which are common across both weight signals 602. At least a portion of these frequencies may be designated as the noise signal 606. In some implementations, a threshold may be set, such that the noise signal 606 is designated based on a minimum or maximum amplitude or power at a frequency or range of frequencies.

The signal comparator 604 produces an output comprising a de-noised weight signal 608. In one implementation, the de-noised weight signal 608 may be generated by taking a difference of the weight signal 602 and the noise signal 606. For example, the noise signal 606 may be subtracted from the first weight signal 602(1), resulting in the de-noised weight signal 608. The de-noised weight signal 608 may be provided to a processing unit 610, described below.

The signal comparator 604 may utilize other inputs as well, to generate the de-noised weight signal 608. For example, the signal comparator 604 may be configured to account for changes in mechanical resonances present in the frame 508 to which the weight sensor 212 is coupled.

In some implementations, the signal comparator 604 may receive other input, such as an other signal 612 from one or more sensors 120, such as a vibration sensor 214, motion sensor 216, microphone 218, and so forth. The other signal 612 may contain information about the noise. For example, the other sensor 120 may comprise a vibration sensor 214 affixed to the frame 508 to which the weight sensor 212 is coupled. The other signal 612 thus may not contain information indicative of weight. Due to the physical coupling of the sensor 120 to the same noise as the weight sensor 212, the other signal 612 may include the noise signal 606.

In one implementation, a single weight sensor 212 and one or more other sensors 120, such as the vibration sensor 214, the motion sensor 216, the microphone 218, and so forth, may provide the inputs to the signal comparator 604. The noise signal 606 may be determined by comparing the weight signal 602 and the other signal 612. As described above, the de-noised weight signal 608 may be produced by an operation on the weight signal 602. For example, the noise signal 606 may be subtracted from the weight signal 602.

The de-noised weight signal 608 may be provided to the processing unit 610. The processing unit 610 uses the de-noised weight signal 608 to generate at least a portion of the weight data 126. For example, the processing unit 610 may comprise an analog-to-digital converter (ADC) configured to generate a digital value indicative of the de-noised weight signal 608 and a microprocessor configured to perform a lookup and associate the digital value with a particular weight value.

Figure 7:
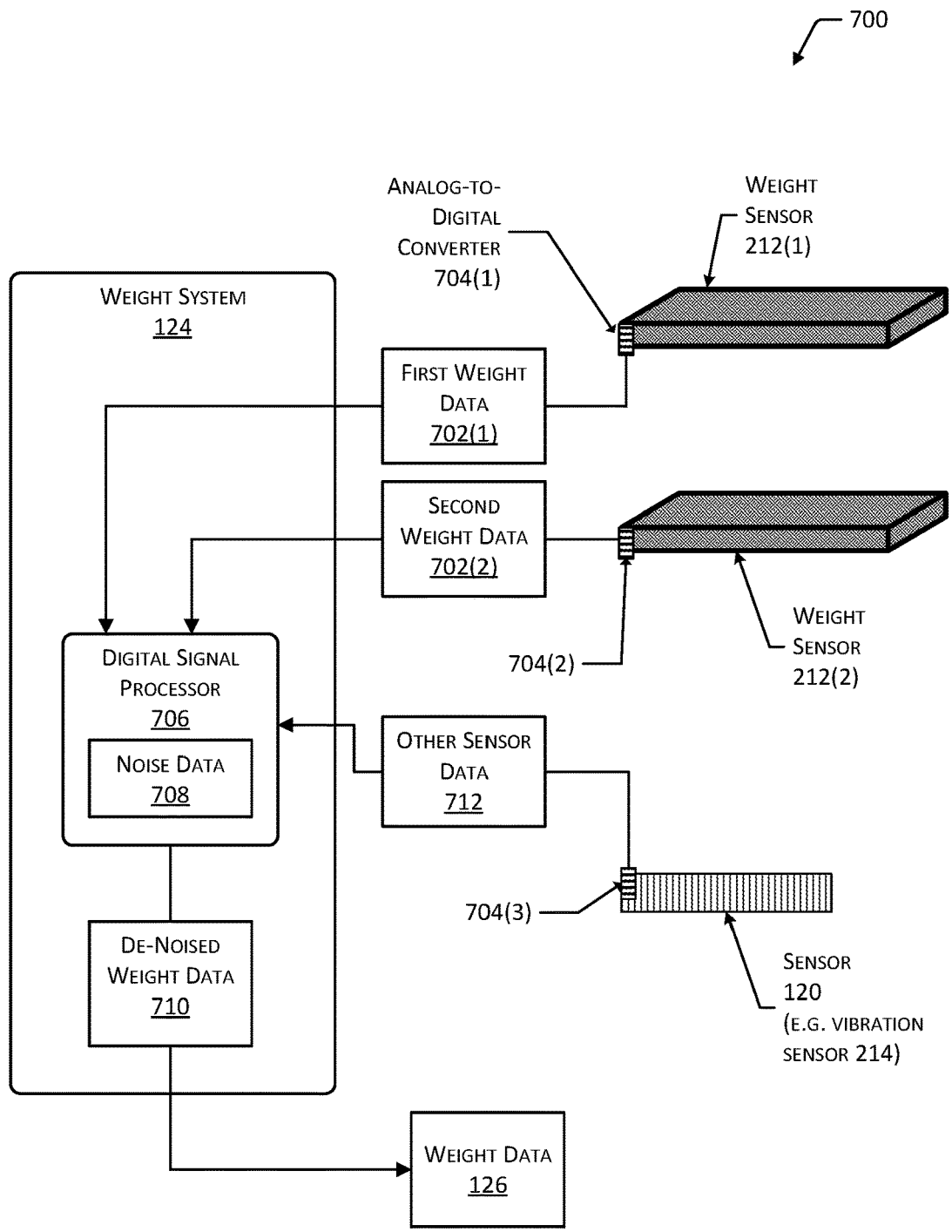
FIG. 7 illustrates a weight system using digital processing to determine weight, according to some implementations.

FIG. 7 illustrates an implementation 700 of the weight system 124 using digital processing to determine the weight data 126. As described above, the weight system 124 is configured to determine and compensate for noise in the output from one or more weight sensors 212 by using output from another weight sensor 212 or other sensor 120 such as a vibration sensor 214.

As illustrated here a first weight sensor 212(1) produces a first "raw" weight data 702(1) while a second weight sensor 212(2) produces a second "raw" weight data 702(2). The data is "raw" or unprocessed in that noise may be expressed therein. In some implementations, the weight sensor 212 may be an analog device, or a device which produces an analog output. In these implementations, an analog-to-digital converter (ADC) 704 may be used to generate the weight data 126 from a weight signal. As described above, the "raw" weight data 702 includes the information indicative of the weight of the load 210 on the respective weight sensor 212, as well as noise.

The "raw" weight data 702 may be provided to a digital signal processor 706. In some implementations, the digital signal processor 706 may comprise digital circuitry such as program memory configured to store instructions used to process data, data memory used to store information to be processed, a compute engine configured to perform one or more mathematical operations and access the memories, and one or more input/output devices. For example, the digital signal processor 706 may provide one or more time-based filters which may be used to filter inputs.

The "raw" weight data 702 may comprise information expressed in the time domain. In some implementations, the digital signal processor 706 may be configured to determine noise data 708 by analyzing inputs in the frequency domain, the time domain, or both. To obtain the frequency domain, the digital signal processor 706 may perform a transform on the "raw" weight data 702 such as a Fourier or Laplace transform. In one implementation, a discrete Fourier transform, or an approximation of a discrete Fourier transform may be used. The information in the frequency domain may be compared to determine frequencies which are common across both "raw" weight data 702(1) and 702(2). At least a portion of these frequencies may be designated as the noise data 708. In some implementations a threshold may be set, such that the noise data 708 is designated based on a minimum or maximum amplitude or power at a frequency or range of frequencies.

In some implementations, the generation of the noise data 708 may be based at least in part on analysis of the weight data 702 in the time domain. For example, the noise data 708 may be determined in the time domain by determining one or more common signal components present in the weight data 702 contemporaneously with one another. In another example, the noise data 708 may be determined based on the common frequency components as well as those common in the time domain.

In some implementations, the digital signal processor 706 may apply other filtering or signal processing techniques. For example, the digital signal processor 706 may provide for using one or more digital filters.

The digital signal processor 706 produces an output comprising a de-noised weight data 710. In one implementation, the de-noised weight data 710 may be generated by taking a difference of the "raw" weight data 702 and the noise data 708. For example, the noise data 708 may be subtracted from the first "raw" weight data 702(1), resulting in the de-noised weight data 710.

The digital signal processor 706 may utilize other inputs as well, to generate the de-noised weight data 710. For example, the digital signal processor 706 may be configured to account for changes in mechanical resonances present in the frame 508 to which the weight sensor 212 is coupled.

In some implementations, the digital signal processor 706 may receive other input, such as other sensor data 712 from one or more sensors 120, such as a vibration sensor 214, motion sensor 216, microphone 218, and so forth. The other sensor data 712 may contain information about the noise. For example, the other sensor 120 may comprise a vibration sensor 214 affixed to the frame 508 to which the weight sensor 212 is coupled. The other sensor data 712 thus may not contain information indicative of weight. Due to the physical coupling of the sensor 120 to the same noise as the weight sensor 212, the other sensor data 712 may include the noise data 708.

In one implementation, a single weight sensor 212 and one or more other sensors 120, such as the vibration sensor 214, the motion sensor 216, the microphone 218, and so forth, may provide the inputs to the digital signal processor 706. The noise data 708 may be determined by comparing the weight data 702 and the other sensor data 712. As described above, the de-noised weight data 710 may be produced by an operation on the weight data 702. For example, the noise data 708 may be subtracted from the weight data 702.

In some implementations, the weight system 124 may use one or more machine learning techniques to process the input signals and generate the de-noised weight data 710. For example, a neural network may be employed to analyze the weight data 702 and the other sensor data 712 to determine the noise data 708.

The de-noised weight data 710 may be output as at least a portion of the weight data 126. For example, the weight system 124 may generate weight data 126 which includes the device identifier of the weight sensor 212, and the de-noised weight data 710 indicating the weight of the load 210 on the weight sensor 212.

In some implementations, aspects of the weight systems 124 depicted in FIG. 6 and FIG. 7 may be combined. For example, the weight system 124 may comprise a hybrid of analog and digital components in which some operations are performed in the analog domain, and others are performed digitally.

Illustrative Processes

Figure 8:
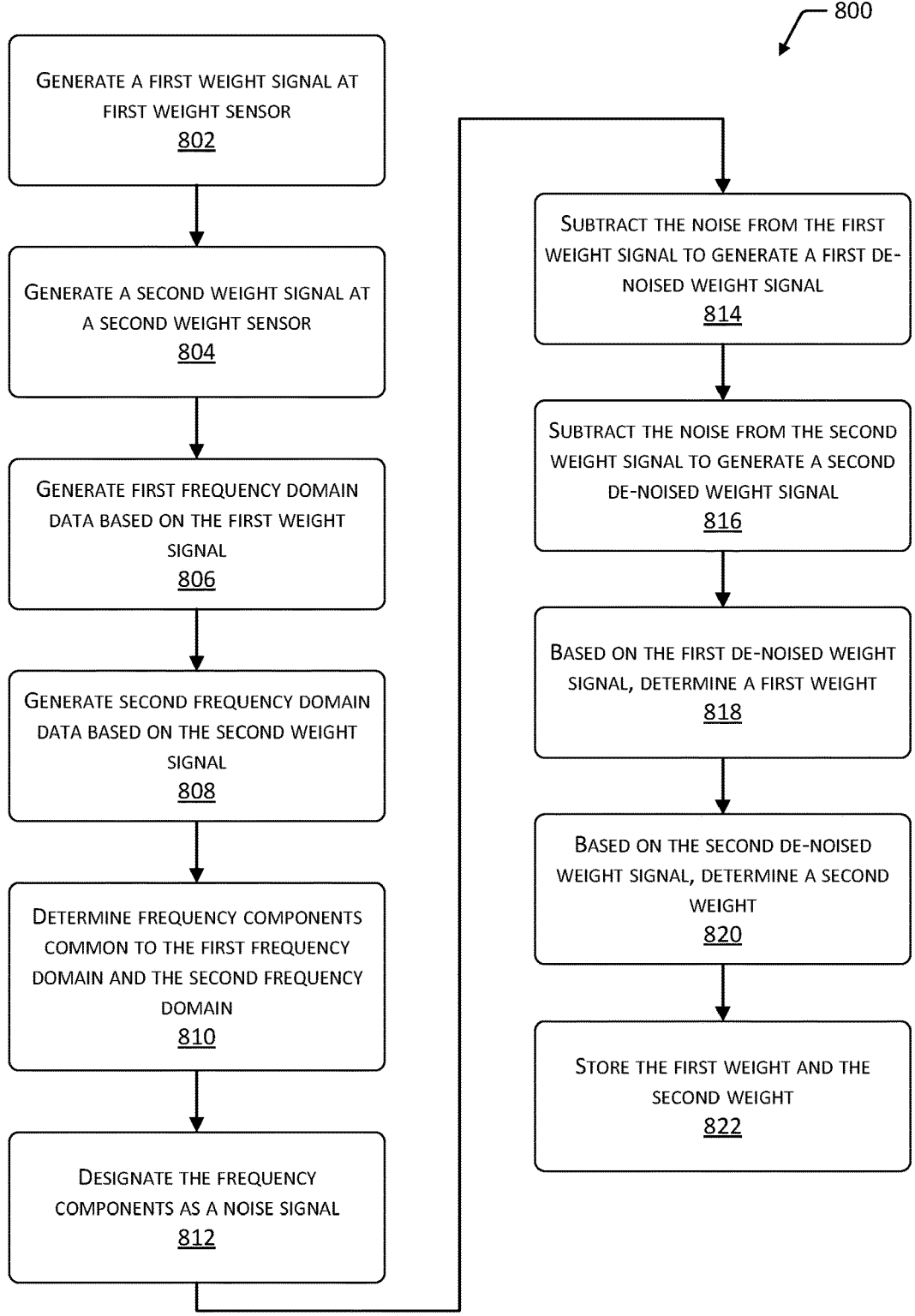
FIG. 8 depicts a flow diagram of a process for removing noise from a weight signal using a signal from another scale and determining the weight of a load, according to some implementations.

FIG. 8 depicts a flow diagram of a process 800 for removing noise from a weight signal using a signal from another scale and determining the weight of a load, according to some implementations. The process may be performed at least in part by the weight system 124, such as described above with regard to FIG. 6.

Block 802 generates a first weight signal 602(1) indicative of a first load 210(1) at a first weight sensor 212(1). For example, a load cell of the weight sensor 212 may generate a weight signal 602 comprising a voltage, wherein the voltage is proportionate to the load 210 on a platform attached to the load cell. Block 804 generates a second weight signal 602(2) indicative of a second load 210(2) at a second weight sensor 212(2). In some implementations, the second load 210(2) may be supported at least in part by a load cell of the second weight sensor 212(2). Continuing the example second weight signal 602(2) may be generated in similar fashion as described above. In some implementations, the second load 210(2) of the second weight sensor 212(2) may be configured to weigh a mass having a constant value and may be otherwise unavailable for use in weighing items 104. The second weight sensor 212(2) with the mass of constant value may thus generate a reference signal which is indicative of the noise. In some implementations, the first weight sensor 212(1) and the second weight sensor 212(2) may use a same type of weight sensing mechanism. For example, both may use a load cell with a strain gauge.

Block 806 generates first frequency domain data based on the first weight signal 602(1). For example, the signal comparator 604 may use a Fourier transform, Laplace transform, or both to convert the time domain first weight signal 602(1) to the first frequency domain. In some implementations, the first frequency domain information may be expressed as a signal.

Block 808 generates second frequency domain data based on the second weight signal 602(2). As above, in some implementations, the second frequency domain information may be expressed as a signal.

Block 810 determines one or more frequency components common to both the first frequency domain and the second frequency domain. For example, a 60 Hz signal above a threshold amplitude may be present in both the first frequency domain and the second frequency domain. This 60 Hz signal is deemed to be common between the two. Block 812 designates the frequency components as a noise signal 606.

In some implementations, the generation of the noise signal 606 may be based at least in part on analysis of the weight signals 602 in the time domain. For example, the noise signal 606 may be determined in the time domain by determining one or more common signal components present in both weight signals 602 in the time domain. In another example, the noise signal 606 may be determined based on the common frequency components as well as those common in the time domain.

Block 814 subtracts the frequency component, designated as the noise signal 606, from the first weight signal 602(1) to generate a first de-noised weight signal 608(1). In other implementations, other operations may be performed to determine the de-noised weight signal 608. Block 816 subtracts the frequency component, designated as the noise signal 606, from the second weight signal 602(2) to generate a second de-noised weight signal 608(2).

Based on the first de-noised weight signal 608(1), block 818 determines a first weight of the first load 210(1). Based on the second de-noised weight signal 608(2), block 820 determines a second weight of the second load 210(2). For example, the processing unit 610 receives as input the de-noised weight signals 608, and provides as output data indicative of the weight.

Block 822 stores or transmits the first weight and second weight. For example, the weight data 126 including the first weight and a second weight may be sent using a transmitter to the inventory management system 122.

Figure 9:
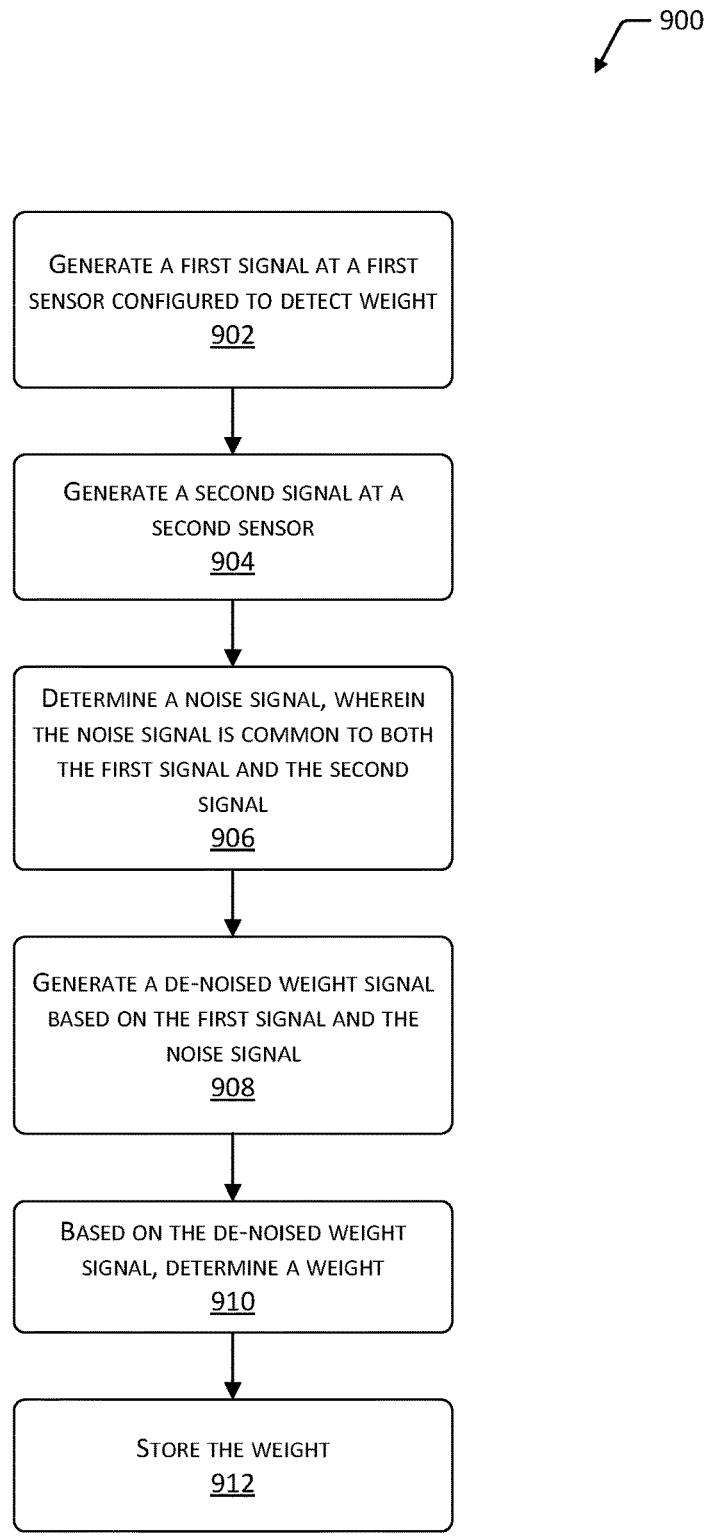
FIG. 9 depicts a flow diagram of a process for removing noise from a weight signal using a signal from another sensor and determining the weight of a load, according to some implementations.

FIG. 9 depicts a flow diagram of a process 900 for removing noise from a weight signal using a signal from another sensor 120 and determining the weight of a load, according to some implementations. The process may be performed at least in part by the weight system 124, such as described above with regard to FIG. 6.

Block 902 generates a first signal at a first sensor configured to detect weight. For example, first weight signal 602 may be generated at weight sensor 212, which is configured to detect the weight of a load 210. As described above, the first weight sensor 212 may be attached to the frame 508 of the tote 118.

Block 904 generates a second signal at a second sensor. For example, second signal 612 may be generated at a second sensor 120. The second sensor 120 may include one or more of the vibration sensor 214, the motion sensor 216, the microphone 218, and so forth.

The second signal 612 may be representative of motion of the frame 508. The motion may include one or more of translation, rotation, vibration, and so forth, of a structure in communication with the frame 508 and the first weight sensor 212. In one implementation, the second sensor 120 may be affixed to the frame 508, the first weight sensor 212, and so forth. In another implementation, the second sensor 120 may be attached to a structure external to, but in communication with, the frame 508. For example, the second sensor 120 may be arranged within the floor 502 of the facility 102 upon which the tote 118 bearing the first weight sensor 212 is supported.

Block 906 determines a noise signal common to both the first signal and the second signal, such as noise signal 606. This determination may include processing the first signal and the second signal in the time domain, the frequency domain, or both. For example, in the time domain the first signal and the second signal may be analyzed to look for signal components which occur contemporaneously. In some implementations the processing may include scaling or normalizing the signals relative to one another.

In one implementation, as described above, the process may generate first frequency domain data based on the first weight signal 602(1) and generate second frequency domain data based on the second signal 612. The process may then determine one or more frequency components present in the first frequency domain and the second frequency domain. At least a portion of these frequency components may be designated as the noise signal 606.

Block 908 generates a de-noised weight signal based on the first signal and the noise signal. For example, de-noised weight signal 608 may be generated based on first weight signal 602(1) and noise signal 606. As described above, the de-noised weight signal 608 comprises a difference between the noise signal 606 from the first weight signal 602(1). For example, the noise signal 606 may be subtracted from the first weight signal 602(1).

Based on the de-noised weight signal, block 910 determines a weight. For example, a weight of the load 210 may be determined based on de-noised signal 608. In another implementation, the de-noised weight signal 608 may be transmitted to another device for processing.

Block 912 may store or transmit the weight. For example, the weight data 126 may be transmitted to the inventory management system 122.

Figure 10:
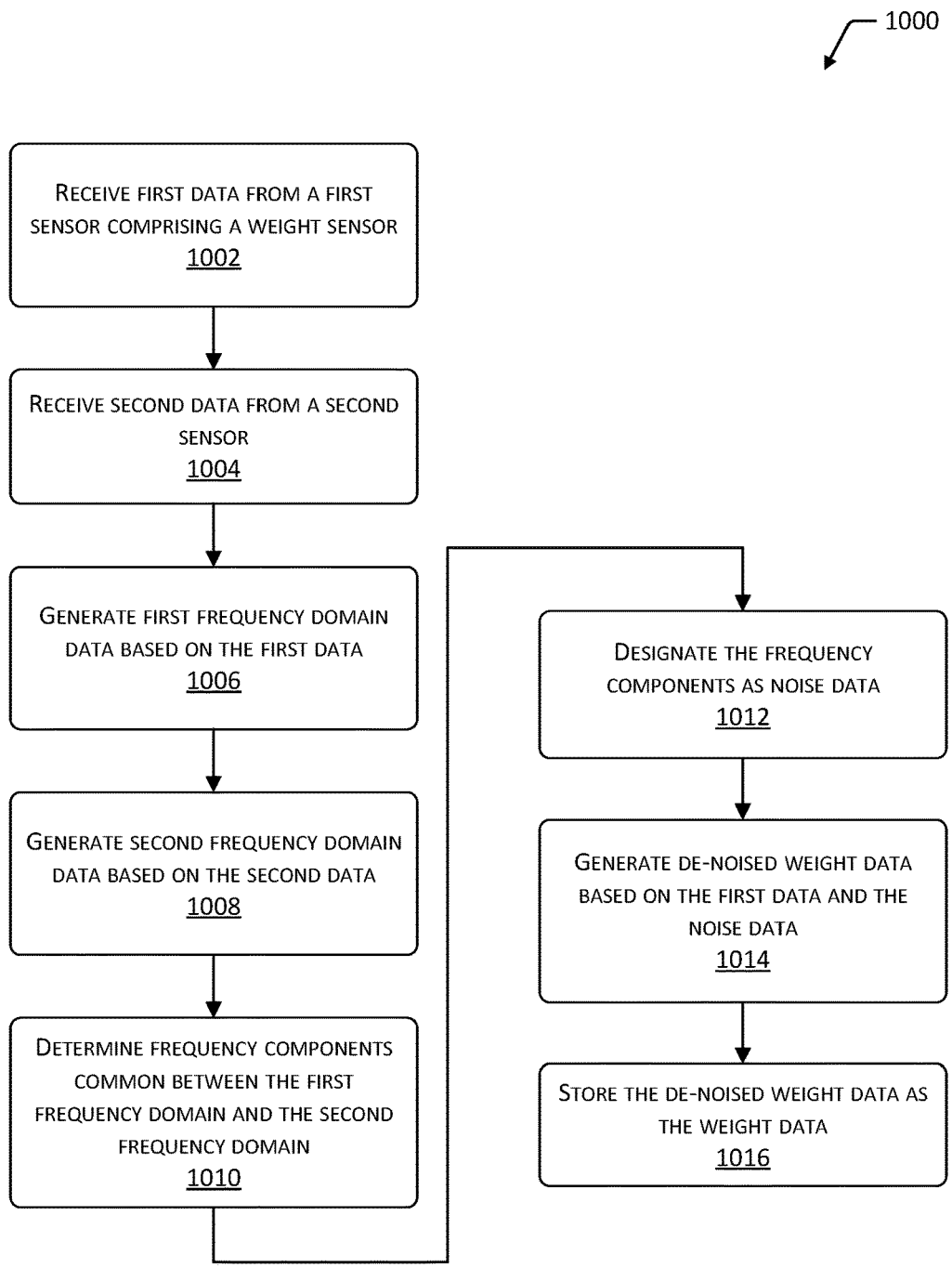
FIG. 10 depicts a flow diagram of a process for removing noise from weight data using data from another sensor and determining the weight of a load, according to some implementations.

FIG. 10 depicts a flow diagram of a process 1000 for removing noise from weight data using data from another sensor and determining the weight of a load 210, according to some implementations. The process may be performed at least in part by the weight system 124, such as described above with regard to FIG. 7.

Block 1002 receives first data from a first sensor comprising a weight sensor. For example, "raw" first weight data 702(1) may be received from a first weight sensor 212(1) configured to measure weight of a load 210 supported by a structure. Block 1004 receives second data from a second sensor. For example, other sensor data 712 may be received from a second sensor 120 configured to measure vibration of at least a portion of the structure.

In some implementations, the first weight data 702(1) and the other sensor data 712 may be received and stored in CRSM. This data may then be accessed from the CRSM and processed as described below. For example, the tote 118 may transmit the first weight data 702(1) and the other sensor data 712 to the weight system 124 executing on the server 204. The weight system 124 executing on the server 204 may then execute the process as described.

As described above, in some implementations, the second sensor 120 may comprise a vibration sensor 214 or accelerometer affixed to the structure. The other sensor data 712 may then comprise information indicative of one or more motions of at least a portion of the structure.

The process determines noise data 708 indicative of a noise signal present in the first weight data 702(1) and the other sensor data 712. This determination may include the operations described below with respect to blocks 1006 through 1012.

Block 1006 generates first frequency domain data based on the first data, such as first weight data 702(1). For example, a Fourier or Laplace transformation may be applied to the first data 702(1).

Block 1008 generates second frequency domain data based on the second data, such as other sensor data 712. For example, a Fourier or Laplace transformation may be applied to the other sensor data 712.

Block 1010 determines one or more frequency components common between the first frequency domain and the second frequency domain. For example, the digital signal processor 706 may perform a comparison operation between the first and second frequency domains.

Block 1012 designates the frequency components as noise data, such as noise data 708. As described above, in some implementations, this designation may be based at least in part on an amplitude or power of the one or more frequency components satisfying one or more conditions. These conditions may include but are not limited to, a minimum amplitude, a maximum amplitude, a frequency or set of frequencies, and so forth.

Block 1014 generates de-noised weight data based on the first data and the noise data. For example, de-noised weight data 710 may be generated based on first weight data 702(1) and noise data 708. For example, the values of the noise data 708 may be subtracted from the values of the first weight data 702(1).

Block 1016 may store the de-noised weight data as the weight data. For example, de-noised weight data 710 may be stored as weight data 126. In some implementations, the weight data 126 may be transmitted to the inventory management system 122.

By using the systems and techniques described in this application, it becomes possible to accurately determine the weight of a load 210 in the presence of one or more noise sources 504, while the weight sensor 212 is in motion, and so forth. As a result of the increase in accuracy, the inventory management system 122 is provided with weight data 126 usable to track the items 104 in the facility 102.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. An apparatus comprising:
    a moveable device;
    a first sensor to generate a first signal indicative of a weight of a load on the moveable device;
    a second sensor to generate a second signal associated with the moveable device; and
    a processing unit, in communication with the first sensor and the second sensor, to:
        determine first data based on the first signal;
        determine second data based on the second signal;
        determine one or more components that are common to both the first data and the second data; and
        determine a first portion of the first data is invalid based on the one or more components that are common to both the first data and the second data.

2. The apparatus of claim 1, the processing unit further to:
    compare the first data and the second data;
    wherein the one or more components that are common to the first data and the second data represent noise that is common to both the first data and the second data.

3. The apparatus of claim 1, the processing unit further to:
    determine a threshold;
    compare, to the threshold, one or more of the first data or the second data; and
    wherein the one or more components that are common to both the first data and the second data represent a time signal or a frequency signal that is common to both the first data and the second data.

4. The apparatus of claim 1, the processing unit further to:
    determine a second portion of the first data that is valid based on the first data and the first portion of the first data; and
    wherein the first portion of the first data and the second portion of the first data are mutually exclusive.

5. The apparatus of claim 1, the processing unit further to:
    determine, at a first time, a second portion of the first data that is valid;
    determine, at the first time, first weight data associated with a load on the moveable device, based on the second portion of the first data;
    determine, at a second time, second weight data associated with a load on the moveable device;
    determine a change in weight at the moveable device from the first time to the second time based on the first weight data and the second weight data; and
    wherein the change in weight at the moveable device corresponds to one or more of a removal of one or more items from the moveable device or a placement of one or more items to the moveable device.

6. The apparatus of claim 1, wherein:
the first sensor is a weight sensor;
the first signal is an analog time-varying voltage proportionate to the load on the weight sensor;
the second sensor is a vibration sensor; and
the second signal is an analog vibration signal; and
the processing unit further to:
convert the first signal to the first data; and
convert the second signal to the second data.

7. The apparatus of claim 1, wherein the first signal is a time domain signal; and the apparatus further comprising a second processing unit to:
determine frequency domain data for the first signal by performing one or both of a Fourier or Laplace transform on the first signal; and
wherein the frequency domain data for the first signal is the first data.

8. The apparatus of claim 1, wherein the second sensor comprises a vibration sensor, and the second data is indicative of a frequency of vibration detected at one or more portions of the moveable device.

9. The apparatus of claim 1, wherein the second sensor comprises one or more of:
a weight sensor, or
a motion sensor.

10. The apparatus of claim 1, wherein:
the first data is represented in a first frequency domain; and
the second data is represented in a second frequency domain; and
the processing unit further to:
determine frequency components common to the first data and the second data;
designate the frequency components that are common to the first data and the second data as noise; and
wherein the first portion of the first data that is invalid is based on the noise.

11. The apparatus of claim 1, further comprising:
one or more wheels;
one or more frames for stowage of items;
the first sensor coupled to one or more of the one or more frames; and
the second sensor coupled to one or more of the one or more frames.

12. A system comprising:
a tote;
a first weight sensor coupled to the tote, the first weight sensor to generate first data indicative of a weight of a load on the tote;
a second sensor coupled to the tote, the second sensor to generate second data associated with the tote; and
a processing unit to:
determine third data common to both the first data and the second data; and
determine fourth data that excludes the third data, wherein the fourth data is a subset of the first data.

13. The system of claim 12, the processing unit further to:
determine, at a first time, first valid weight data for the tote, based on the fourth data;
determine, at a second time, second valid weight data for the tote;
determine a change in weight at the tote from the first time to the second time, based on the first valid weight data and the second valid weight data; and
wherein the change in weight at the tote from the first time to the second time is indicative of one or more of removal of one or more items from the tote or addition of one or more items to the tote.

14. The system of claim 12, wherein:
the first data is represented in a first frequency domain;
the second sensor is a second weight sensor; and
the second data is represented in a second frequency domain; and
the processing unit further to:
determine frequency components common to the first data and the second data; and
designate the frequency components that are common to the first data and the second data as the third data.

15. The system of claim 12, the processing unit further to:
subtract the third data from the first data to determine first de-noised weight data;
subtract the third data from the second data to determine second de-noised weight data;
determine first weight data based on the first de-noised weight data;
determine second weight data based on the second de-noised weight data; and
store the first weight data and the second weight data.

16. The system of claim 12, wherein:
the second sensor comprises one or more of:
a vibration sensor, or
a motion sensor;
the second data is indicative of one or more of vibration or motion of the tote; and
the third data is a result of the vibration or the motion of the tote.

17. A method comprising:
accessing first data from a first weight sensor of a moveable device;
accessing second data from a second sensor of the moveable device;
determining one or more components that are common to the first data and the second data; and
determining a first portion of the first data is invalid based on the one or more components that are common to the first data and the second data.

18. The method of claim 17, further comprising:
determining a second portion of the first data that is valid based on the first data and the first portion of the first data; and
wherein the first portion of the first data and the second portion of the first data are mutually exclusive.

19. The method of claim 17, wherein:
the second sensor comprises a vibration sensor;
the second data is indicative of a frequency of vibration detected at the moveable device; and
the first portion of the first data that is invalid is a result of vibration at the moveable device.

20. The method of claim 17, wherein:
the second sensor comprises a motion sensor;
the second data is indicative of motion at the moveable device; and
the first portion of the first data that is invalid is due to the motion at the moveable device.

21. The method of claim 17, wherein:
the first data is represented in a first frequency domain; and
the second data is represented in a second frequency domain; and the method further comprising:
- determining frequency components common to the first data and the second data; and
- designating the frequency components that are common to the first data and the second data as the first portion of the first data that is invalid.

22. The method of claim 17, further comprising:
determining a second portion of the first data that is valid;
determining, at a first time, first valid weight data for the moveable device based on the second portion of the first data that is valid;
determining, at a second time, second valid weight data for the moveable device;
determining a change in weight for the moveable device based on the first valid weight data and the second valid weight data; and
wherein the change in weight for the moveable device is indicative of one or more of a removal of one or more items from the moveable device or an addition of one or more items to the moveable device.

* * * * *